(12) United States Patent
Hild et al.

(10) Patent No.: US 10,150,704 B2
(45) Date of Patent: Dec. 11, 2018

(54) CEMENTITIOUS TILE ADHESIVE COMPOSITIONS CONTAINING CROSSLINKED CELLULOSE ETHERS FOR MORTARS WITH ENHANCED GEL-STRENGTH

(71) Applicant: DOW GLOBAL TECHNOLOGIES LLC, Midland, MI (US)

(72) Inventors: Alexandra Hild, Soltau (DE); Joerg Neubauer, Hamburg (DE); Joern Breckwoldt, Hamburg (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/567,210

(22) PCT Filed: Jun. 29, 2016

(86) PCT No.: PCT/US2016/039956
§ 371 (c)(1),
(2) Date: Oct. 17, 2017

(87) PCT Pub. No.: WO2017/004119
PCT Pub. Date: Jan. 5, 2017

(65) Prior Publication Data
US 2018/0099906 A1  Apr. 12, 2018

Related U.S. Application Data

(60) Provisional application No. 62/186,620, filed on Jun. 30, 2015.

(51) Int. Cl.
| | |
|---|---|
| C04B 28/04 | (2006.01) |
| C08B 11/08 | (2006.01) |
| C08B 15/00 | (2006.01) |
| C04B 40/06 | (2006.01) |
| C04B 111/00 | (2006.01) |
| C04B 14/06 | (2006.01) |
| C04B 24/38 | (2006.01) |

(52) U.S. Cl.
CPC .......... *C04B 28/04* (2013.01); *C04B 40/0608* (2013.01); *C08B 11/08* (2013.01); *C08B 15/005* (2013.01); *C04B 14/06* (2013.01); *C04B 24/386* (2013.01); *C04B 2111/00646* (2013.01); *C04B 2111/00689* (2013.01); *C04B 2201/00* (2013.01)

(58) Field of Classification Search
CPC ..... C04B 28/04; C04B 40/0608; C04B 14/06; C04B 14/28; C04B 24/383; C04B 24/386; C04B 2111/00689; C04B 2111/00646; C04B 2201/00; C08B 11/08; C08B 15/005
See application file for complete search history.

(56) References Cited

U.S. PATENT DOCUMENTS

| | | | |
|---|---|---|---|
| 4,321,367 A * | 3/1982 | Cheng | C08B 31/006 536/87 |
| 7,041,168 B2 * | 5/2006 | Schlesiger | C04B 24/383 106/172.1 |
| 2004/0127700 A1 | 7/2004 | Schlesiger et al. | |
| 2006/0169183 A1 | 8/2006 | Waser | |
| 2010/0258037 A1 | 10/2010 | Mann et al. | |
| 2012/0318434 A1 | 12/2012 | Kim-Habermehl et al. | |
| 2014/0182486 A1 | 7/2014 | Lee et al. | |
| 2014/0262023 A1 | 9/2014 | Kiesewetter et al. | |
| 2015/0075792 A1 | 3/2015 | Brandl et al. | |

FOREIGN PATENT DOCUMENTS

| | | |
|---|---|---|
| EP | 0115955 | 10/1998 |
| GB | 1225755 | 3/1971 |
| WO | 2015076874 | 5/2015 |

OTHER PUBLICATIONS

G. Bartelmus and R. Ketterer, Fresenius Zeitschrift fuer Analytische Chemie, vol. 286 (1977, Springer, Berlin, DE), pp. 161 to 190.

* cited by examiner

*Primary Examiner* — Anthony J Green

(57) ABSTRACT

The present invention provides cementitious tile adhesives comprising ordinary Portland cement, sand or another inorganic filler, and from 0.12 to 0.6 wt. % of total solids of one or more polyether group containing crosslinked cellulose ethers. The present invention also provides methods of making the polyether group containing crosslinked cellulose ethers comprising crosslinking a cellulose ether at 90° C. or less, in an inert atmosphere, e.g. nitrogen, in the presence of a polyether group containing crosslinking agent and in the presence of alkali; the process may comprise part of a stepwise addition process of making of a cellulose ether itself in which the crosslinking of the cellulose ethers precedes at least one addition of alkyl halide or alkylene oxide to form, respectively, alkyl or hydroxyalkyl groups on the cellulose.

11 Claims, No Drawings

CEMENTITIOUS TILE ADHESIVE COMPOSITIONS CONTAINING CROSSLINKED CELLULOSE ETHERS FOR MORTARS WITH ENHANCED GEL-STRENGTH

The present invention relates to dry mix compositions comprising cement and cellulose ethers containing polyether groups and having enhanced gel strength for use in making cementitious tile adhesives, as well as methods for using the compositions. In addition, the present invention provides methods of making crosslinked cellulose ethers by crosslinking at 40° C. to 90° C. in an inert atmosphere a cellulose ether in the presence of a polyether group containing crosslinker.

Cellulose ethers are employed in mortars in various construction applications impart water retention properties that limit loss of water from the mortar to absorbing substrates as well as to improve the rheology of the mortar. Additionally, cellulose ethers allow for a steady setting rate and high final mechanical strength. However, cellulose ethers pose drawbacks as highly viscous cellulose ethers, those with a viscosity level of 40000 mPas-70000 mPas (2 wt. % aq. solution, 2.55 $s^{-1}$ at 20° C.), are difficult to access because of the difficulty in sourcing and processing raw material (pulp). So, with more readily available cellulose ethers, the addition rate or dosage of cellulose ether remains high (0.22-0.45 wt. %, based on total solids) to create sufficient water retention to retain a useful pot life. On the other hand, such a high cellulose ether addition rate in any formulation leads to very high formulation costs.

US patent publication 2004/0127700A1, to Schlesiger et al. discloses crosslinked cellulose ethers having gel-like rheology as well as methods for making the cellulose ethers and then crosslinking them. The Schlesiger cellulose ether compositions behave in a viscoelastic manner in aqueous solution. However, such compositions do not provide cementitious tile adhesives and do not disclose the crosslinked cellulose ethers of the present invention.

The present invention seeks to solve the problems of providing cementitious tile adhesive compositions with cellulose ethers that form mortars without excessive stickiness or tack, even when a low dosage of the cellulose ether is used.

STATEMENT OF THE INVENTION

1. In accordance with the present invention dry mix compositions for use in making cementitious tile adhesives or mortars comprise from 20 to 35 wt. %, or, preferably, from 20 to 30 wt. % of ordinary portland cement, from 64.7 to 79.9 wt. %, or, preferably, from 69.85 to 74.9 wt. % of sand or an inorganic filler, such as crushed calcium carbonate, for example, having an average particle size (determined by a LAVIB sieve machine, Siebtechnik, Muelheim, DE) of 100%<0.8 mm, or, preferably, 100%<0.5 mm, and one or more crosslinked cellulose ethers containing polyether groups in the amount of from 0.12 to 0.6 wt. %, such as 0.15 wt. % to 0.6 wt. %, or, preferably, from 0.12 to 0. 0.45 wt. %, or, more preferably, from 0.12 to 0.29 wt. % or less, all wt. % s being wt. % of total solids.

2. In accordance with the dry mix compositions of items 1, above, at least one of the one or more crosslinked cellulose ethers is a mixed cellulose ether that contains hydroxyalkyl groups and alkyl ether groups, such as those chosen from alkyl hydroxyethyl celluloses, e.g. hydroxyalkyl methylcelluloses, and is, preferably, chosen from hydroxyethyl methylcellulose (NEMC), hydroxypropyl methylcellulose (HPMC), methyl hydroxyethyl hydroxypropylcellulose (MHEHPC), and ethylhydroxyethyl cellulose (EHEC).

3. In accordance with the dry mix compositions of any one of items 1 or 2, above, wherein the polyether group in the crosslinked cellulose ethers is a polyoxyalkylene which has from 2 to 100 or, preferably, 2 to 20, or, more preferably, from 3 to 15 oxyalkylene groups.

4. In accordance with the dry mix compositions of any one of items 1, 2, or 3, above, wherein the polyether group in the crosslinked cellulose ethers is a polyoxyalkylene chosen a polyoxyethylene, a polyoxypropylenes and combinations thereof.

5. In accordance with the dry mix compositions of any one of items 1, 2, 3, or 4, above, wherein the crosslinked cellulose ether is a polyoxypropylene group containing hydroxyethyl methylcellulose.

6. In another aspect of the present invention, the present invention provides methods of using the dry mix compositions of any of items 1 to 5, above, comprising combining the dry mix composition with water or aqueous liquid to make a mortar, applying the mortar to the unfinished side or backside of one or more tiles, placing the mortar containing backside of the one or more tiles on a substrate, such as a floor or wall, and letting the mortar set.

7. In yet another aspect of the present invention, the present invention provides methods of making polyether group containing crosslinked cellulose ethers by crosslinking at 90° C. or less, or, preferably, 60° C. or higher in an inert atmosphere, preferably, a nitrogen atmosphere, a cellulose ether in the presence of a polyether group containing crosslinking agent in an amount of from 0.0001 to 0.05 eq, or, preferably, from 0.0005 to 0.01 eq, or, more preferably, from 0.001 to 0.005 eq, to form a crosslinked polyether group containing cellulose ether, where the unit "eq" represents the molar ratio of moles of the respective crosslinking agent relative to the number of moles of anhydroglucose units (AGU) in the cellulose ether; and, granulating and drying the resulting crosslinked polyether group containing cellulose ether.

8. In accordance with the methods of item 7, above, wherein the polyether group containing crosslinking agent having two or more, preferably, two crosslinking groups chosen from halogen groups, glycidyl groups, epoxy groups, and ethylenically unsaturated groups, e.g. vinyl groups, that form ether bonds with the cellulose ether in crosslinking the cellulose ether, preferably, 1,2-dichloro (poly)alkoxy ethers, e.g. dichloropolyoxyethylene; diglycidyl polyalkoxy ethers, e.g. diglycidyl polyoxypropylene; glycidyl(poly)oxyalkyl methacrylate; diglycidyl phosphonates; or divinyl polyoxyalkylenes containing a sulphone group.

9. In accordance with the methods of any one of items 7, or 8, above, wherein the crosslinking of the cellulose ethers takes place in the reactor in which the cellulose ether itself is made and in the presence of caustic or alkali.

10. In accordance with the methods of any of items 7, 8 or 9, above, wherein the crosslinking of the cellulose ethers precedes one or more addition of (i) alkyl halide, e.g. methyl chloride in the presence of alkali to form alkyl groups on the cellulose or (ii) alkylene oxide in the presence of alkali to form hydroxyalkyl groups on the cellulose; or (iii) both (i) and (ii).

11. In accordance with the methods of any of items 7, 8, 9, or 10, above, wherein the crosslinking of the cellulose ethers comprises part of a stepwise addition process of making of a cellulose ether in which the crosslinking of the cellulose ethers precedes one or more addition of alkyl halide or alkylene oxide in the presence of alkali to form ether groups on the cellulose.

Unless otherwise indicated, all temperature and pressure units are room temperature and standard pressure (STP).

All phrases comprising parentheses denote either or both of the included parenthetical matter and its absence. For example, the phrase "(meth)acrylate" includes, in the alternative, acrylate and methacrylate.

All ranges recited are inclusive and combinable. For example, a disclosure of from 50 to 120° C. or, preferably, from 60 to 100° C. will include all of from 50 to 120° C., from 50 to 60° C., from 60 to 120° C., from 100 to 120° C., from 50 to 100° C. or, preferably, from 60 to 100° C.

As used herein the term "aqueous" means that the continuous phase or medium is water and from 0 to 10 wt. %, based on the weight of the medium, of water-miscible compound(s). Preferably, "aqueous" means water.

As used herein, the phrase "based on total solids" refers to weight amounts of any given ingredient in comparison to the total weight amount of all of the non-volatile ingredients in the aqueous composition, including synthetic polymers, cellulose ethers, acids, defoamers, hydraulic cement, fillers, other inorganic materials, and other non-volatile additives. Water, and volatile solvents are not considered solids.

As used herein the term "DIN EN" refers to a English language version of a German materials specification, published by Beuth Verlag GmbH, Berlin, Del. And, as used herein, the term "DIN" refers to the German language version of the same materials specification.

As used herein the term "dry mix" means a storage stable powder containing cement, cellulose ether, any polymeric additive, and any fillers and dry additives. No water is present in a dry mix; hence it is storage stable.

As used herein the term "DS" is the mean number of alkyl substituted OH groups per anhydroglucose unit in a cellulose ether, as determined by the Ziesel method. The term "Ziesel method" refers to the Zeisel Cleavage procedure for determination of MS and DS. see G. Bartelmus and R. Ketterer, Fresenius *Zeitschrift fuer Analytische Chemie*, Vol. 286 (1977, Springer, Berlin, Del.), pages 161 to 190.

As used herein the term "low or medium viscosity crosslinked cellulose ether" means a crosslinked cellulose ether which, absent crosslinking, would have a viscosity of from 10,000 to 40,000 mPas measured as a 2 wt. % solution in water using a Haake Rotovisko™ RV 100 rheometer (Thermo Fisher Scientific, Karlsruhe, Del.) at 20° C. and a shear rate 2.55 s$^{-1}$.

As used herein the term "high viscosity crosslinked cellulose ether" means a crosslinked cellulose ether which, absent crosslinking, would have a viscosity of more than 40,000 mPas measured as a 2 wt. % solution in water using a Haake Rotovisko™ RV 100 rheometer (Thermo Fisher Scientific, Karlsruhe, Del.) at 20° C. and a shear rate 2.55 s$^{-1}$.

As used herein the term "MS" is the mean number of moles of etherification reagent which are bound as ether per mol of anhydroglucose unit as hydroxyalkyl substituents in a cellulose ether, as determined by the Ziesel method. The term "Ziesel method" refers to the Zeisel Cleavage procedure for determination of MS and DS. see G. Bartelmus and R. Ketterer, *Zeitschrift fuer Analytische Chemie*, Vol. 286 (1977, Springer, Berlin, Del.), pages 161 to 190.

As used herein the term "set" refers to the curing of a mortar which happens under ambient conditions in the presence of water and continues as the mortar dries.

As used herein the term "wt. % of total solids" means the weight of a given composition based on the total weight on non-volatile ingredients in the composition, determined by volatility at ambient temperature and pressure. Volatiles include water, solvents that evaporate under conditions of ambient temperature and pressure, like methyl ethyl ketone, and gases, like ammonia.

Surprisingly it has been found that the use of crosslinked cellulose ethers containing polyether groups in the crosslinker, preferably cellulose ethers containing alkyl ether and hydroxyalkyl groups, significantly improves the behavior of cementitious tile adhesive compositions in terms of enhanced adhesion strength. In addition, the present invention enables the reduction of cellulose ether dosage by more than 20% without compromising product and application performance through the use of the inventive crosslinked ethers which have enhanced gel strength characteristics, such as, at a given concentration, a greater degree of thickening or viscosity in the elastic static relative to the same cellulose ether measured in the viscous state. The crosslinked cellulose ethers of the present invention can be used at significantly lower addition rates to make an economic cementitious tile adhesive.

Suitable cellulose ethers for use in the methods to make the crosslinked polyether group containing cellulose ethers of the present invention may include, for example, a hydroxyalkyl cellulose or an alkyl cellulose, or a mixture of such cellulose ethers. Examples of cellulose ether compounds suitable for use in the present invention include, for example, methylcellulose (MC), ethyl cellulose, propyl cellulose, butyl cellulose, hydroxyethyl methylcellulose (NEMC), hydroxypropyl methylcellulose (HPMC), hydroxyethyl cellulose ("NEC"), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). Preferably, the cellulose ethers are mixed cellulose ethers that contain hydroxyalkyl groups and alkyl ether groups, such as alkyl hydroxyethyl celluloses, such as hydroxyalkyl methylcelluloses, for example, hydroxyethyl methylcellulose (HEMC), hydroxypropyl methylcellulose (HPMC), methyl hydroxyethyl hydroxypropylcellulose (MHEHPC), and ethylhydroxyethyl cellulose (EHEC).

In the cellulose ethers of the present invention, alkyl substitution is described in cellulose ether chemistry by the term "DS". The DS is the mean number of substituted OH groups per anhydroglucose unit. The methyl substitution may be reported, for example, as DS (methyl) or DS (M). The hydroxy alkyl substitution is described by the term "MS". The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Fresenius *Zeitschrift fuer Analytische Chemie* 286 (1977), 161-190).

A crosslinked HEC preferably has a degree of substitution MS (HE) of 1.5 to 4.5, or, more preferably, a degree of substitution MS (HE) of 2.0 to 3.0.

Preferably, mixed ethers of methyl cellulose are used for the crosslinking. In the case of HEMC, a preferred DS (M)

values ranges from 1.2 to 2.1 or, more preferably, from 1.3 to 1.7, or, even more preferably, from 1.35 to 1.65, and MS (HE) values range from 0.05 to 0.75, or, more preferably, from 0.15 to 0.45, or, even more preferably, from 0.20 to 0.40. In the case of HPMC, preferably, DS (M) values range from 1.2 to 2.1, or, more preferably, from 1.3 to 2.0 and MS (HP) values range from 0.1 to 1.5, or, more preferably, from 0.15 to 1.2.

Crosslinking agents suitable for use in the present invention may include compounds having a polyoxyalkylene or polyalkylene glycol group and two or more, preferably, two crosslinking groups, such as halogen groups, glycidyl or epoxy groups, or ethylenically unsaturated groups, e.g. vinyl groups, that form ether bonds with the cellulose ether in crosslinking the cellulose ether.

Suitable bifunctional compounds may be chosen from, for example, 1,2-dichloro (poly)alkoxy ethers, dichloropolyoxyethylene, diglycidyl polyalkoxy ethers, diglycidyl phosphonate, divinyl polyoxyalkylenes containing a sulphone group. Compounds which bear two different functional groups can also be used. Examples of these are diglycidyl polyoxypropylenes and glycidyl(poly)oxyalkyl methacrylate.

The amount of crosslinking agent used may range from 0.0001 to 0.05 eq, where the unit "eq" represents the molar ratio of moles of the respective crosslinking agent relative to the number of moles of anhydroglucose units (AGU) of the cellulose ether. The preferred amount of crosslinking agent used is 0.0005 to 0.01 eq, or, more preferably, the amount of crosslinking agent used is 0.001 to 0.005 eq.

The methods for crosslinking cellulose ether to make the polyether group containing cellulose ethers of the present invention may take place by crosslinking the cellulose ethers in the reactor in which the cellulose ether itself is made and in the presence of caustic or alkali. Thus, the crosslinking reaction is generally conducted in the process of making a cellulose ether.

Because the process of making a cellulose ether comprises stepwise addition of reactants to form alkyl or hydroxyalkyl groups on cellulose, preferably, the crosslinking of the cellulose ethers precedes one or more addition of alkyl halide, e.g. methyl chloride, in the presence of alkali to form alkyl ethers of the cellulose.

Any step in the stepwise addition to form alkyl, hydroxyalkyl or ether groups on cellulose, whether it occurs before or after the crosslinking of the cellulose ethers may take place at any temperature of from 40 to 90° C., preferably, 70° C. or less, or, more preferably, 65° C. or less.

Further, so that the cellulose ethers are not degraded or broken down in processing, the crosslinking reaction is carried out in an inert atmosphere and at temperatures of from room temperature to 90° C. or less, or, preferably, at as low a temperature as is practicable; for example, the process preferably is carried out at from 60° C. to 90° C. or, preferably, 70° C. or more.

After the polyether group containing cellulose ethers of the present invention are made, they are granulated and dried. Granulation may follow dewatering or filtering to remove excess water, if needed.

The cementitious tile adhesives dry mix compositions are formed by mixing all of the materials of the present invention in dry form.

Cementitious tile adhesives compositions can be sold as a dry mix powder.

The compositions of the present invention can include inorganic fillers. The predominant inorganic filler may be sand, silica, or calcium carbonate, usually derived from limestone.

The dry mix compositions of the present invention may further include an emulsion polymer binder formed by an aqueous emulsion polymerization method in a solid form as a water redispersible polymer powder. Aqueous emulsion polymers may be selected from various compositional classes such as, for example, vinyl acetate polymers, vinyl acetate-acrylic copolymers, vinyl acetate-ethylene copolymers, acrylic polymers, styrene-butadiene copolymers, and blends thereof.

Other ingredients such as accelerators, such as calcium formate, additional organic or inorganic thickening agents and/or secondary water retention agents, anti-sag agents, wetting agents, defoamers, dispersants, water repellents, biopolymers, fibres or may be included in the dry mix compositions of the present invention. All of these other ingredients are known in the art and are available from commercial sources.

A suitable cementitious tile adhesive dry mix composition in accordance with the present invention may comprise, and may further comprise from 0.010 to 0.050 wt. % of total solids of a starch ether, and at least 0.1 wt. % of total solids of the polyether group containing crosslinked cellulose ether.

The compositions of the present invention find use as cementitious tile adhesives for floor and wall tiles.

EXAMPLES

The following materials were used:
Epilox™ M985 poly(propyleneglycol) diglycidylether crosslinker (Leuna-Harze GmbH, Leuna, Del.) is a linear poly(propyleneglycol) diglycidylether made from polypropylene glycol (PPG) having a molecular weight of ~400 daltons and having the formula below;

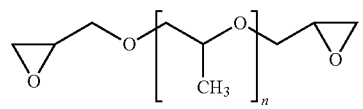

wherein n is 5.7-6.7.

Synthesis Example 1A

Ground cellulose flock (1.5 mol) was added to a 5 L autoclave. After purging the autoclave trice with nitrogen gas, the reactor was heated to 40° C. Then dimethylether (DME, 4.7 mol/mol AGU), and methyl chloride (MCl 1; 3.2 mol/mol AGU) were injected into the autoclave. Caustic soda (NaOH, strength 50 wt. % aqueous, 1.9 mol NaOH/mol AGU) was added in 3 portions during 2 minutes at a temperature of 40° C. The reaction mixture was held at 40° C. for 30 minutes. Ethylene oxide (0.45 mol/mol AGU) was then added and the reaction mixture was held for 10 min at 40° C.

The mass was heated to 80° C. in 45 minutes. At 80° C., methyl chloride MCl 2 (1.3 mol/mol AGU) was injected quickly to the mass. Afterwards, NaOH (0.67 mol/mol AGU) was added in 7 portions over 30 minutes followed by a 70 minute cook-off time at 80° C. Thus, an extra addition of methyl chloride followed the crosslinking reaction. Following this, the product was dewatered and washed in hot (96° C.) water, neutralized with formic acid, granulated, dried and milled.

Synthesis Example 2

The synthesis in Example 1 was repeated except on a larger scale, where ground cellulose flock (400 mol) was added to a 1000 L autoclave.

Synthesis Example 3

The synthesis in Example 1 was repeated, except that after ethylene oxide addition and heating to 40° C. for, 10 min, the crosslinker (Epilox™ M985 crosslinker, 0.0025 mol crosslinker/mol AGU) was dissolved in 20 ml isopropanol and added to the cellulose ether (NEMC) product in six increments in 30 second intervals. Then the mass was heated to 80° C. for 45 minutes and MCl was added and the synthesis completed.

Using this poly(propyleneglycol) diglycidylether crosslinker, no additional reaction time other than dosage time was required to crosslink the cellulose ether.

Synthesis Example 4

The synthesis in Example 3 was repeated, except that 0.003 mol/mol AGU of the crosslinker was added.

Synthesis Example 5

The synthesis in Example 4 was repeated, except on a larger scale, where ground cellulose flock (400 mol) was added to a 1000 L autoclave.

Cellulose ethers were tested and characterized as discussed below in the form of aqueous solutions and, as well, in tile adhesive mortars having the indicated compositions.

Gel Strength:

A rheological oscillation test was run with the indicated cellulose ethers as a 1 wt. % aqueous solution similar to the manner described in U.S. patent pub. no. 2004/0127700A1 at pages 2 and 3, paragraphs [0035]-[0044], page 6, paragraphs [0095] to [0105]). The test was run with each indicated cellulose ether solution at 20° C. using a Universal Dynamic Spectrometer™ UDS 200 rheometer (Physica Messtechnik GmbH, Stuttgart, Del.). The indicated cellulose ether or crosslinked cellulose ether was dissolved in water in the amount of 1.0 parts by weight of the cellulose ether, on a dry basis, and 99.0 parts per weight of water. To make the aqueous solution, the cellulose ether was dispersed over 1 minute in the water at room temperature with stirring to avoid the formation of lumps. Afterwards the mixture was stirred at 1000 rpm for 10 min. Then over 24 h, the solution was stored in a round glass vessel tightly sealed with a lid and rotated slowly about its longitudinal (horizontal) axis for the full 24 hours.

In the test, a cone/plate of 50 mm diameter, cone of 1° cone angle and 0.05 mm flattening of the cone point was used and, its angular frequency (ω) in radians/s was changed in the range of (ω) from 0.1 to 100 with a deformation of 0.5%. The storage modulus (G') and loss modulus (G") in Pascal were measured as a function of angular frequency (ω). The material being measured is called a gel if G' is greater than G". A plot of modulus (in Pa) versus angular frequency (in rad/s) reveals two lines sloping up to the right, one for each of G' and G". At a lower angular frequency, loss modulus (G") will be greater than storage modulus (G'). The angular frequency (ω) at the intersection of the lines G' and G", where G' and G" are identical, is defined as the Crossover point. At angular frequencies lower than this cross over point the materials show no gel characteristics above the cross over point is shows gel characteristics. The earlier the crossover point, the greater the gel strength of the cellulose ether.

The characteristics of the various cellulose ether materials tested in the Examples are shown in Table 1, below.

TABLE 1

Characteristics of Crosslinked Cellulose Ethers

| Example | 1* (HEMC) | 1A* (HEMC) | 2* (HEMC) | 3 | 4 | 5 |
|---|---|---|---|---|---|---|
| Crosslinker (mol/mol AGU) | w/o | w/o | w/o | 0.0025 | 0.003 | 0.003 |
| DS-M | 1.60 | 1.52 | 1.64 | 1.53 | 1.55 | 1.67 |
| MS-HE | 0.28 | 0.25 | 0.3 | 0.24 | 0.21 | 0.27 |
| Viscosity[1] (mPas, 1%) | 9460 | 5212 | 9800 | 14150 | 12990 | 12800 |
| Crossover Point (ω) | — | 18.9 | 6.0 | 1.3 | 4.8 | 2.7 |

Viscometer, shear and T (a 1 wt. % in water, Haake Rotovisko RV 100 rheometer, shear rate 2.55 s$^{-1}$ 20° C.);
*Denotes Comparative Example.

As shown in Table 1, above, Examples 3, 4 and 5 exhibit a crossover point at a substantially lower angular frequency versus comparative Examples 1A and 2 by anywhere from 20% to over 90%. Accordingly, the data consistently show enhanced gel strength of the crosslinked cellulose ether of the present invention when compared to commercial HEMC in the same use.

The gel strength of the inventive crosslinked cellulose ethers surprisingly results even with the very slight degree of crosslinking.

Cementitious tile adhesive formulations for an economic tile adhesive were tested. Tile adhesives in Batch A comprised ordinary portland cement (OPC, CEM I 42.5) 30 wt. %, and silica sand (Type F34 Quarzwerke Frechen, Frechen, PSD 99%<0.355 mm as measured by sieve machine EML 200 digital plus, Haver & Boecker, Oelde, Del.) 70 wt. %, and the indicated crosslinked or comparative cellulose ether in the indicated amounts, all amounts being wt. % of total solids. See Tables 3 and 4, below. Tile adhesives in Batch B comprised ordinary portland cement (OPC, CEM I 42.5) 30 wt. %, and silica sand (Type F34, Quarzwerke Frechen, Frechen, DE, PSD 100%<0.500 mm as measured by sieve machine EML 200 digital plus, Haver & Boecker, Oelde, Del.) 70 wt. %, and the indicated crosslinked or comparative cellulose ether in the indicated amounts, all amounts being wt. % of total solids. See Table 2, below.

All tile adhesive materials were combined as dry mix to which water was added to make a mortar in following manner: Water was filled into a Toni Technik laboratory mixer (Toni Technik, Berlin, Del.) and 1 kg of the dry mix was added within 15 seconds while mixing on speed 1 (lower speed). After addition of the dry mix was completed, mixing was continued for another 30 seconds. After waiting for one minute during which the mortar was removed from the mixer blade, the mortar was again mixed for one minute at speed 1. After this the mortar was allowed to ripen for five minutes. After this period the mortar finally was mixed for 15 seconds on speed 2 (high mixing speed).

Test Methods:

Cement Tile Adhesives were tested, as follows:

Adhesive Strength:

The adhesive strength of CBTA compositions was determined according to European Standard EN 1348 (DIN EN 1348, Beuth Verlag GmbH, Berlin, Del, 2007). In such tests, the tensile adhesive strength is determined following storage of adhered tiles under the conditions: Normal storage (7 d) adhered tiles stored for 7 days under standard climate conditions of 23° C. and 50% relative humidity; and, normal storage (28 d) adhered tiles stored for 28 days under standard climate conditions of 23° C. and 50% relative humidity.

Stirring Test in Order to Determine Water Demand:

This test determines the consistency of the mortar and the optimum water-to-solid ratio. One mixes 100 g of a dry mix for a tile adhesive into a 150 ml cup with a defined quantity of water. The mixture is stirred for 30 s with a wooden stirrer (hardwood, 250×13×5 mm), stirring for up to an addition 60 s if the mixture fails to become homogeneous after 30 s. The consistency of the adhesive, its initial thickening behavior (i.e. time thickening begins after mixing), shear stability, and stirring resistance are observed. Then, the entire sample is removed from the cup using the wooden stirrer and its surface and standing strength is determined. To determine standing strength, as much of the mortar sample as can be held on narrow side of the stirrer is removed from the cup and is visually observed after 30 s to assess mortar paste consistency. To determine shear stability, the mortar sample is returned to the cup and is left to set for 5 min. Then, the sample is stirred again for 1 min, during which its thickening behaviour, shear stability and stirring resistance are assessed. Then the standing strength (shear stability after further stirring) on the wooden stirrer and the surface of the adhesive are assessed for the second time. Standing strength and shear stability are visually assessed for mortar paste consistency, as follows:

| | |
|---|---|
| 100% = | full standing strength |
| 97.5% = | almost no movement of the tile adhesive |
| 95% = | slow continual movement |
| 92.5% = | faster continual movement |
| 90% = | faster continual movement, still good cohesion, but runs off |
| 85% = | adhesive is difficult to pick up and tears off abruptly |
| <80% = | adhesive cannot be properly taken up onto the wooden stirrer, adhesive has a thin/runny consistency. |

An acceptable result is at least 95%; a preferred result is at least 97.5%.

Water Demand:

The stirring test is used to assess a proper water dosage for preparing a mortar paste with a laboratory mixer. The water demand is reported as the fraction of the total weight of the mortar which comprises water. The amount of water (dosage) reported for evaluating each CBTA formulation is that which resulted in 100% for standing strength assessment and 97.5% or more for assessment of shear stability for the mortar pastes.

Table 2, below summarizes the findings of the assessment of cement tile adhesives formulated as a Batch B containing the indicated amount of the indicated crosslinked cellulose ethers of the present invention in comparison to cellulose ethers which are not crosslinked.

In Table 2, below, the cellulose ether of comparative Example 1*, above was used in comparative Example 6*; and, the cellulose ether of Example 3, above was used in Examples 7, 8 and 9.

As shown in Table 2, below, at an addition rate of 0.3 wt. % of total solids, in the same mortar compositions with various cellulose ethers, the water demand of the crosslinked cellulose ethers of the present invention in Example 7 is higher than the same cellulose ether in comparative Example 6 which is not crosslinked; this effect is caused by the higher viscosity of the inventive crosslinked cellulose ethers. The adhesion strength in one case, Example 7, (after 28 d) is at the same level with the HEMC in comparative Example 6. However, in Examples 8 and 9 containing a significantly lower addition rate of the inventive crosslinked cellulose ethers show that the water demand is as low as with the comparative HEMC of Example 6 in the same mortar; however, the adhesion strength values in Examples 8 and 9 are significantly higher than in the comparative Example 6. Apparently, a lower absorption of the crosslinked cellulose ether to cement particles in early (first few hours) cement hydration at the lower low cellulose ether loading below 0.29 wt. %), thereby resulting in faster cement hydration and higher final adhesion strength.

TABLE 2

Cement Tile Adhesives with Crosslinked Cellulose Ethers

| EXAMPLE | 6* (0.3 wt. % HEMC) | 7 (0.3 wt. %) | 8 (0.27% wt. %) | 9 (0.25% wt. %) |
|---|---|---|---|---|
| Viscosity[1] (mPas) | 9460 | 14150 | 14150 | 14150 |
| water demand stirring test | 0.21 | 0.225 | 0.215 | 0.21 |
| standing strength (%) | 100 | 100 | 100 | 100 |
| shearing strength (%) | 97.5 | 97.5 | 97.5 | 97.5 |
| adhesive strength (N/mm$^2$) EN 1348 7 d; nc (23 C./50%) | 0.69 | — | 0.87 | 0.96 |
| adhesive strength (N/mm$^2$) EN 1348 28 d; nc (23 C./50%) | 0.72 | 0.72 | 0.83 | 0.85 |

[1]1% aq. soln (Haake Rotovisko RV 100 rheometer, shear rate 2.55 s$^{-1}$, 20° C.);
*Denotes comparative Example.

In a separate Batch A, cementitious tile adhesives were made with cellulose ethers produced on a laboratory scale and the results are shown in Table 3, below. The HEMC of comparative Example 1 was used in Example 10 and the Crosslinked cellulose ether of Example 4 was used in Examples 10 and 11.

TABLE 3

Cement Tile Adhesives with Crosslinked Cellulose Ethers

| EXAMPLE | 10* (0.3 wt. % HEMC) | 11 (0.3 wt. %) | 12 (0.27 wt. %) |
|---|---|---|---|
| Viscosity[1] (mPas) | 9460 | 12990 | 12990 |
| water demand stirring test | 0.21 | 0.23 | 0.225 |
| standing strength (%) | 100 | 100 | 100 |
| shearing strength (%) | 97.5 | 97.5 | 97.5 |
| adhesive strength (N/mm$^2$) EN 1348 28 d; nc (23 C./50%) | 0.72 | 0.75 | 0.8 |

*Denotes comparative Example;
[1] 1 wt. % sol'n in water, Haake Rotovisko RV 100 rheometer, shear rate 2.55 s$^{-1}$, 20° C.

As shown in Table 3, above, at the same loading of crosslinked cellulose ethers in comparative Example 10 and Example 11, the crosslinked cellulose ethers of the present invention provide slightly higher adhesion strength; however, at lower cellulose ether addition rates, the crosslinked cellulose ethers of the present invention provide substantially higher adhesion strengths.

In another separate Batch A, cementitious tile adhesives were made using cellulose ether that had been produced on a pilot plant scale and the results are shown in Table 4, below.

TABLE 4

Cement Tile Adhesives with Crosslinked Cellulose Ethers

| EXAMPLE | 12* (0.2 wt. % Ex 2* HEMC) | 13 (0.18 wt. % Ex. 5 CL CE) |
|---|---|---|
| Viscosity[1] (mPas) | 9800 | 12800 |
| water demand stirring test | 0.21 | 0.21 |
| standing strength (%) | 100 | 100 |
| shearing strength (%) | 97.5 | 97.5 |
| adhesive strength (N/mm$^2$) EN 1348 28 d; nc (23 C./50%) | 0.51 | 0.8 |

*Denotes comparative Example;
[1] 1 wt. % sol'n in water, Haake Rotovisko RV 100 rheometer, shear rate 2.55 s$^{-1}$, 20° C.

As shown in Table 4, above, the inventive crosslinked cellulose ether in Example 13 gave a tile adhesive having a substantially higher adhesion strength than the same tile adhesive with the same cellulose ether that was not crosslinked in comparative Example 12. The remaining tile adhesive properties were comparable.

We claim:

1. A dry mix composition for use in making cementitious tile adhesives or mortars comprising from 20 to 35 wt. % of ordinary portland cement, from 64.7 to 79.9 wt. % of sand or an inorganic filler, and one or more crosslinked cellulose ethers containing polyether groups in the amount of from 0.12 to 0.6 wt. % of total solids.

2. The dry mix composition as claimed in claim 1, wherein at least one of the one or more crosslinked cellulose ethers is a mixed cellulose ether that contains hydroxyalkyl groups and alkyl ether groups.

3. The dry mix composition as claimed in claim 2, wherein the one or more crosslinked cellulose ethers is chosen from hydroxyethyl methylcellulose (NEMC), hydroxypropyl methylcellulose (HPMC), methyl hydroxyethyl hydroxypropylcellulose (MHEHPC), and ethylhydroxyethyl cellulose (EHEC).

4. The dry mix composition as claimed in claim 1, wherein the polyether group in the crosslinked cellulose ethers is a polyoxyalkylene which has from 2 to 100 oxyalkylene groups.

5. The dry mix composition as claimed in claim 1, wherein the polyether group in the crosslinked cellulose ethers is a polyoxyalkylene chosen from a polyoxyethylene, a polyoxypropylene and combinations thereof.

6. The dry mix composition as claimed in claim 1, wherein the crosslinked cellulose ether is a polyoxypropylene group containing hydroxyethyl methylcellulose.

7. A method of using the dry mix compositions as claimed in claim 1, comprising combining the dry mix composition with water or aqueous liquid to make a mortar, applying the mortar to an unfinished side or backside of one or more tiles, placing the mortar containing backside of the one or more tiles on a substrate, and letting the mortar set.

8. A method of making polyether group containing crosslinked cellulose ethers comprising crosslinking at 90° C. or less, in an inert atmosphere, a cellulose ether in the presence of a polyether group containing crosslinking agent in an amount of from 0.0001 to 0.05 eq to form a crosslinked polyether group containing cellulose ether, wherein the unit "eq" represents the molar ratio of moles of the respective crosslinking agent relative to the number of moles of anhydroglucose units (AGU) in the cellulose ether; and, granulating and drying the resulting crosslinked polyether group containing cellulose ether.

9. The method as claimed in claim 8, wherein the polyether group containing crosslinking agent having two or more crosslinking groups chosen from halogen groups, glycidyl groups, epoxy groups, and ethylenically unsaturated groups that form ether bonds with the cellulose ether in crosslinking the cellulose ether.

10. The method as claimed in claim 8, wherein the crosslinking of the cellulose ethers takes place in the reactor in which the cellulose ether itself is made and in the presence of caustic or alkali.

11. The method as claimed in claim 8, wherein the crosslinking of the cellulose ethers precedes one or more addition of alkyl halide in the presence of alkali to form alkyl ethers of the cellulose.

* * * * *